United States Patent [19]
Köhler

[11] Patent Number: 5,986,353
[45] Date of Patent: Nov. 16, 1999

[54] ARRANGEMENT FOR THE EXCLUSIVE CONNECTION OF ELECTRICAL LOADS

[75] Inventor: Joachim Köhler, Biebellsheim, Germany

[73] Assignee: Eaton Corporation, Cleveland, Ohio

[21] Appl. No.: 09/115,320

[22] Filed: Jul. 14, 1998

[51] Int. Cl.⁶ ................................................. H02J 003/14
[52] U.S. Cl. ............................................. 307/38; 307/115
[58] Field of Search ................................. 307/11, 30, 38, 307/113, 115, 125, 130

[56] References Cited

U.S. PATENT DOCUMENTS

| | | | |
|---|---|---|---|
| 4,890,001 | 12/1989 | Eickelmann | 307/38 |
| 5,668,494 | 9/1997 | Nicollinni et al. | 327/416 |

FOREIGN PATENT DOCUMENTS

| | | |
|---|---|---|
| 1 640 995 | of 0000 | Germany . |
| 20 08 460 B2 | of 0000 | Germany . |
| 20 57 296 B2 | of 0000 | Germany . |
| 30 26 619 C2 | of 0000 | Germany . |
| DBP 1 040 111 | of 0000 | Germany . |

*Primary Examiner*—Jeffrey Gaffin
*Assistant Examiner*—Ed Garlepp
*Attorney, Agent, or Firm*—Roger A. Johnston

[57] ABSTRACT

A switching system for plural electrical loads connected to a common power line and each individually energized by a separate user actuated line switch between the respective load and the line. A separate normally closed, electrically opened safety switch is series connected with each of the line switches. Separate sensors, preferably diodes, are connected respectively to each load and each sensor also connected to electrically open each of the remaining safety switches upon sensing voltage to its respective load. Preferably the safety switches are electromagnetic relays.

7 Claims, 2 Drawing Sheets

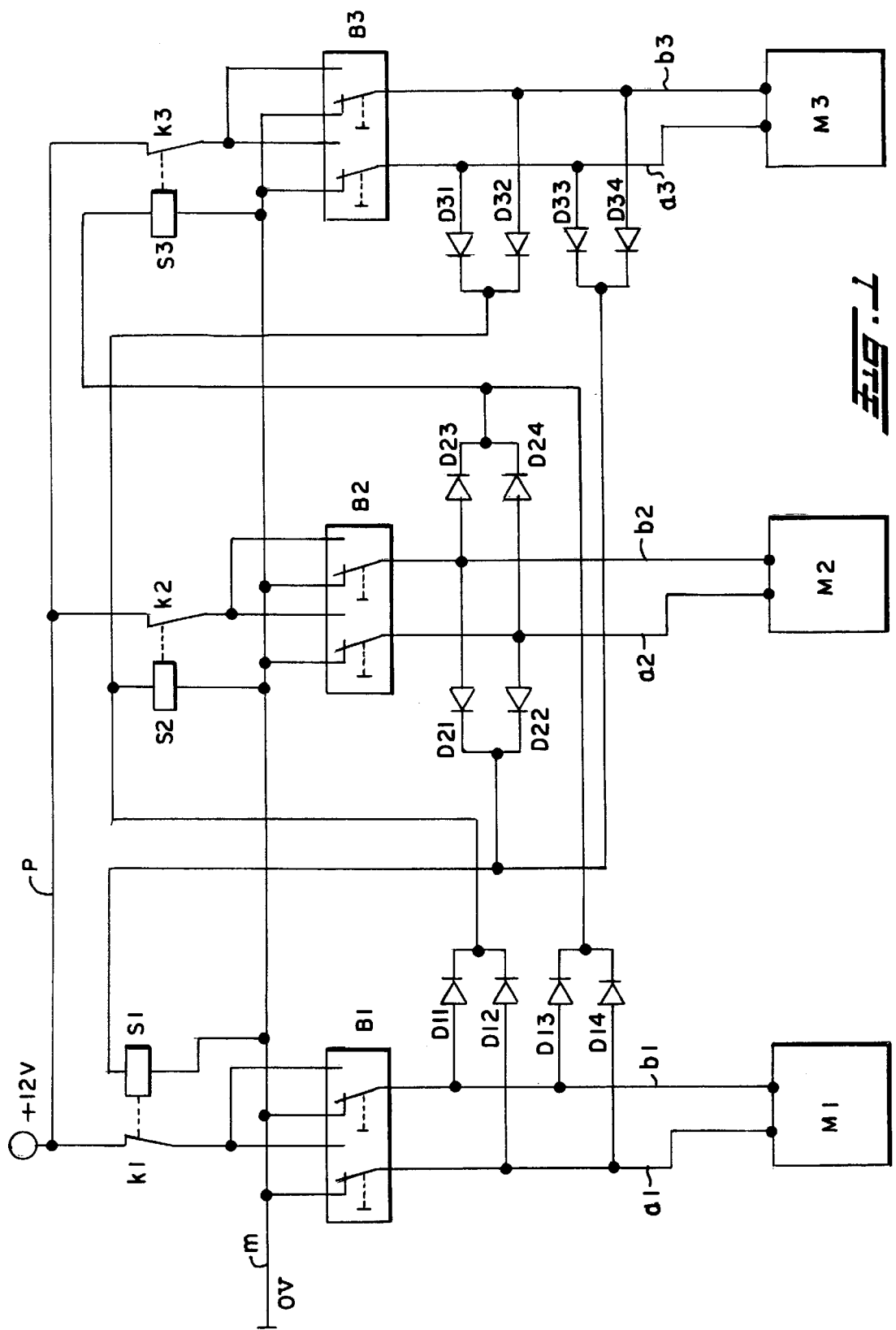

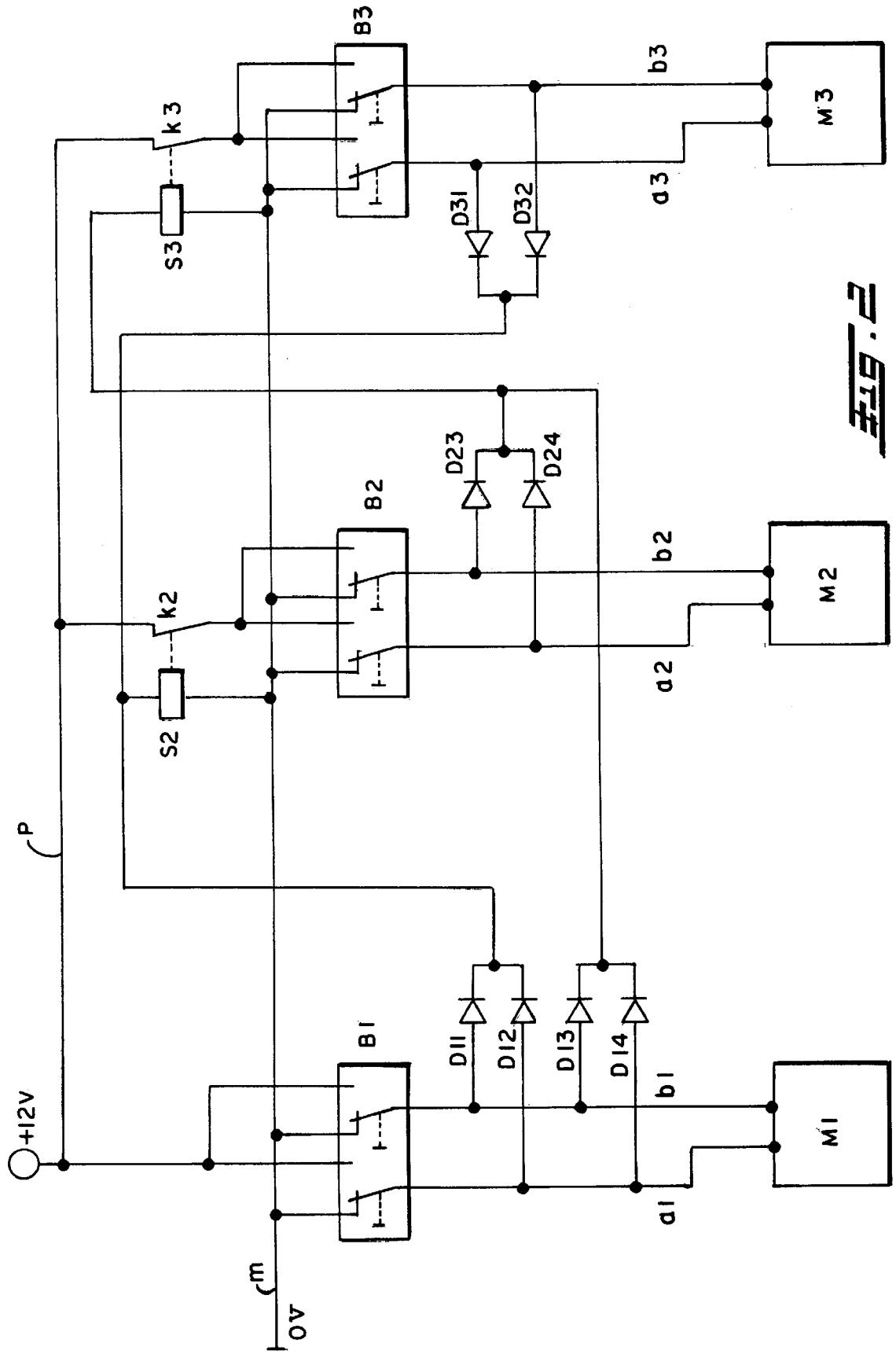

5,986,353

ARRANGEMENT FOR THE EXCLUSIVE CONNECTION OF ELECTRICAL LOADS

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The invention relates to an arrangement for the exclusive connection of a selectable specimen from a plurality of loads, each of which can be switched on via an individual activation switch between the poles of a voltage source.

Arrangements of this type are required if there is a need to prevent various electrical loads being set in operation at the same time, whether it is unintentional or deliberate. In many cases, switching on of more than one load simultaneously can lead to undesirable results, for instance when, a common current supply source is overloaded, or if loads which are switched on simultaneously interfere with one another in their operation or effect. Devices for example, which serve for the spatial adjustment of objects of various sizes, frequently contain a corresponding plurality of electrical drives, the simultaneous activation of which could not be dealt with by the adjustment mechanism or which would make control more difficult for the user or which would overload the current supply source beyond the desired amount. This can arise in motor vehicles, for instance in the devices for adjusting the seat or the steering column.

Various devices are known for the mutual interlocking of any number of switch devices such that only one of the switch devices can be switched on, see for instance, known devices described in DE-PS 1 040 111, DE-AS 20 08 460 and 20 57 296 and also DE 30 26 619 C2. In the devices described there, the switch devices are respectively electromechanical relays, each of which contain further contacts besides the main contact forming the actual circuit break, for instance for the lock of the relay and/or for closing and opening of additional auxiliary circuit breaks which interrupt, upon actuation of the relay, the exciting currents of the respective other relays.

In a known device described in DE-AS 1 640 995, the simultaneous activation of several relays is prevented by a resistor which is switched on before a common exciting current-supply transmission line to the relays. A large drop in voltage occurs across the resistor, upon simultaneous actuation of two or more switches, such that the residual voltage remaining between the transmission lines no longer suffices to allow a relay coil to respond. This embodiment may function without additional relay contacts, but it is sensitive to fluctuations in the supply voltage and requires very exact designing of the electrical components.

A further disadvantage in the above-mentioned known arrangements is that actuation of the switch devices is only possible via contact switches.

BRIEF SUMMARY OF THE INVENTION

The object of the present invention is the creation of an arrangement of the type described above with relatively simple and compact components and which places no severe requirements on the tolerances of the components utilized.

This objective is achieved according to the invention by an arrangement with the features of claim 1. Advantageous developments of the invention are characterized in the sub-claims.

According to the invention, one individual, electrically controllable safety switch respectively is assigned to all loads or to some but not all loads, the safety switch having a control input and a circuit break lying in the feed circuit of the pertinent load, said circuit break normally conducting and being interrupted only if an activation signal occurs at the control input. Furthermore, there is, according to the invention, assigned to each load, an individual electrical sensing device, which, when circuit voltage is applied to the pertinent load, delivers an activation signal to its output, said signal being delivered to the control inputs of the safety switches which are assigned to the other loads.

The invention is different from the state of the art described above principally in that, after switching on a load, the blocking of the other loads results from additional isolation of the pertinent load circuits and not, at in the known devices, by preventing actuation of the assigned actuation switch. In the arrangement according to the invention there is no need for a locking effect to occur on the actuation switch. Any type of actuation switch may be used which can be different from load to load without a special accommodation of the remaining components. This is of particular advantage in the installation of the arrangement into an already existing load system, with actuation switches already installed.

BRIEF DESCRIPTION OF THE DRAWINGS

FIG. 1 is the electrical wiring diagram of the arrangement according to the invention for selective and exclusive connection respectively of one of three reversible electric motors with equality of access; and, FIG. 2 shows the arrangement according to FIG. 1 in a modification for the priority status of one of the electric motors.

DETAILED DESCRIPTION OF THE INVENTION

According to FIG. 1, the terminals of three reversible direct-current electric motors M1, M2 and M3 are connectable via one supply respectively, a1, b1 or a2, b2 or a3, b3 and one assigned actuation switch B1 or B2 or B3 to two voltage transmission lines m and p, the first of which is connected to an earth voltage (0 volt) and the second of which is connected to a circuit voltage (+12 volt) which is delivered by a circuit voltage source (not shown) such as, for example, a battery. Each of the selective switches B1, B2, B3 is represented symbolically as a combination of two single-pole reversing, switches, the movable contacts or "arms" of each pair of reversing switches being connected to the pair of terminal suppliers of the assigned electric motor, while the one fixed contact of each pair of reversing switches is connected to the earth ground transmission line m and the other fixed contact of each pair of reversing switches is connected to the circuit voltage transmission line p via a relay circuit break contact k1 or k2 or k3.

Altogether, there are, therefore, three such relay break contacts present, k1, k2, and k3, each of which respectively is assigned to one of the actuation switches B1, B2, B3 and hence to one of the electric motors M1, M2, M3 respectively; and, upon opening, the break contact interrupts the current supply circuit for the pertinent motor, irrespective of the switching state in which the pertinent actuation switch is placed.

Each actuation switch B1, B2, B3 can be actuated by hand to various switching states in which the connected motor is either switched OFF or switched ON for a first direction of rotation or a second opposite direction of rotation. For example, for the actuation switch B1, if both switch arms are in the shown left position in which both connection lines a1 and b1 and hence both terminals of the electric motor M1 obtain earth ground voltage from the earth transmission line m the motor is switched OFF. If, in a second switching state of the actuation switch B1, the left arm is situated in the right-hand position and the right arm in the shown left hand position, then the left terminal of the motor M1 receives circuit voltage from the transmission line p via the connection line a1 (the relay contact k1 being closed) while the other motor terminal b1 receives earth ground voltage from the transmission line m via the connection line b1 so that the motor is turned ON in a first direction, for example, clockwise.

If, in a third state of the actuation switch B1, the left switch arm is in the shown left position and the right switch arm is in the right position, then the left motor terminal receives earth ground voltage from the transmission line m via the connection line a1, while the right motor terminal receives circuit voltage from the transmission line p via the connection line b1 (the relay contact k1 being closed) so that the motor is switched ON for the reverse direction of rotation, e.g. anti-clockwise.

The actuation switches B2 and B3 function in exactly the same manner for controlling the motors M2 and M3.

In order to prevent a further motor from being switched ON in the switched-ON state of one of the motors, the relay contacts lying in the current supply circuit of the other motors are opened by exciting the assigned relay coils respectively. As is shown, a relay coil S1 or S2 or S3 is assigned to each relay coil k1, k2, k3. Each coil is connected with one of its ends to the earth ground transmission line m. The other end of each relay coil is connected via one diode respectively to each terminal supply line of all those electric motors whose current supply runs over the circuit break contacts of the other relay coils respectively. Each diode is polarized in such a way that it conducts, upon application of the circuit voltage on the motor terminal supply line connected to it, and hence delivers activation voltage to excite the relay coil connected to it. Thus, when one of the motors is switched ON, the relay contacts assigned to the other motors are opened so that the current supply for these other motors is interrupted; and, even by actuating the assigned actuation switch, cannot be switched ON.

In detail, when the motor M1 is switched by the actuation switch B1 (left arm to the right, right arm to the left), the terminal supply line a1 is set to the (positive) circuit voltage so that positive voltage proceeds via the diode D12 to the relay coil S2 and via the diode D14 to the relay coil S3. Relay coils S2, S3 are hence excited so that the contacts k2 and k3 are opened and the assigned motors M2 and M3 can no longer be switched ON. In a similar manner, when the motor M1 is switched ON (left arm to the left, right arm to the right), the terminal supply line b1 is set to the positive circuit voltage so that positive voltage proceeds via the diode D11 to the relay coil S2 and via the diode D13 to the relay coil S3. Both these relay coils are therefore excited so that, as a result of opening the relay contacts k2 and k3, the motors M2 and M3 cannot be switched ON.

The relay coils S2 and S3 form therefore an electrically controllable safety switch with the assigned circuit break contacts k2 and k3 respectively for preventing the assigned motor load from being switched ON. The diodes D11, D12, D13, and D14 form a sensing circuit, which recognizes the switched-ON state of the motor M1 and consequently delivers an activation voltage for opening these safety switches.

In an analogous manner, the relay coil S1 also forms, in common with its circuit break contact k1, a safety switch which is assigned to the motor M1. Also in an analogous manner, the diodes D21, D22, D23, D24, which are connected to the terminal supply lines a2, b2, of the motor M2, form a sensing circuit which recognizes the switched-ON state of the motor M2 and consequently delivers an activation voltage for exciting the relay coils S1 and S3 so that the contacts k1 and k3 are opened and the current supply to the motors M1 and M3 is interrupted. Correspondingly, the diodes D31, D32, D33, D34, form a sensing circuit which recognizes the switched-ON state of the motor M3 and consequently delivers the activation voltage for exciting the relay coils S1 and S2 so that the switches k1 and k2 are closed and the current supply route for the motors M1 and M2 is interrupted.

The circuit arrangement shown in FIG. 1 guarantees therefore that, when any one of the motors M1, M2, M3, is switched ON, the other motors respectively can no longer be switched ON without priority being given to one of the motors.

A modification of the arrangement with priority status for one of the motors is shown in FIG. 2. The arrangement according to FIG. 2 differs from the described arrangement according to FIG. 1 solely in that the safety switch S1, k1 has been eliminated in the current supply route for the motor M1 and also the corresponding diode connections (D21, D22, D33, D34 in FIG. 1) have been omitted. It can be easily seen that, in the arrangement of FIG. 2, priority status is given to motor M1 for switching ON. The motors M2 and M3 are given mutual equal status, as in the case of FIG. 1, i.e. after one of them is switched ON, the other can no longer be switched ON. The motor M1, on the other hand, may hence be switched ON, which leads to the immediate switching-OFF of both of the other motors M2 and M3. The embodiments described presently with reference to FIGS. 1 and 2 should only be regarded as examples of the invention. Instead of the described three loads in the form of reversible electric motors, only two or more than three loads may be provided. Non-reversible motors may also be used as the loads, which reduces the circuit cost for the sensing devices considerably, because, in this case, each sensing device for exciting the electrical state would only need to be provided for one of the two terminal supply lines. The type of load is also not restricted to electric motors. An arrangement according to the invention may be used wherever it is essential in a group of any electrical loads for a simultaneous switching-ON state to be prevented in more than one load.

The arrangement of the actuation switches, the safety switches and the sensing devices according to the invention is not restricted to the embodiments which are described with reference to the drawings. For example, the safety switches can also be semiconductor elements, and, for the sensing devices, devices other than the voltagesensing diode networks can be used, for instance current-sensitive elements with ohmic resistors or optical couplers or inductive or capacitive transformers, the latter especially in the case of alternating current loads.

I claim:

1. A switching system for a plurality of electrical loads connected to a common power line for preventing more than one load from being energized at a given time, said system comprising:

(a) a user-actuated line switch disposed between each of said loads and said power line;

(b) a safety switch disposed in series with the said line switch for each of said loads, each of said safety switches being normally closed and electrically actuated for opening;

(c) an individual electrical sensing device assigned to each load, each of said sensing devices operatively connected to sense application of said power line voltage applied to its respective one of said loads and also operative to thereupon electrically actuate and open the safety switch for each of the remaining loads.

2. The system defined in claim 1, wherein each of said safety switches comprise a relay.

3. The system defined in claim 1, wherein each of said sensing devices comprises a diode.

4. The system defined in claim 1, wherein each of said safety switches comprises an electromagnetically operated relay.

5. The system defined in claim 1, wherein each of said sensing devices comprise diodes; and, said safety switches each include a relay coil with one end of the relay for a given safety switch connected to the output of the diodes for each of the remaining sensors.

6. The system defined in claim 1, wherein said plurality of loads comprises electric motors; and, each of said user-actuated switches comprises a reversing switch connected to the respective one of said motors and operative for effecting operation of the motor in a forward and reverse direction.

7. The system defined in claim 6, wherein one of said sensing devices is connected to the forward and reverse poles of each of said line switches.

* * * * *